(No Model.)
G. KOONS.
Automatic Measuring Milk Cans.
No. 230,136. Patented July 20, 1880.
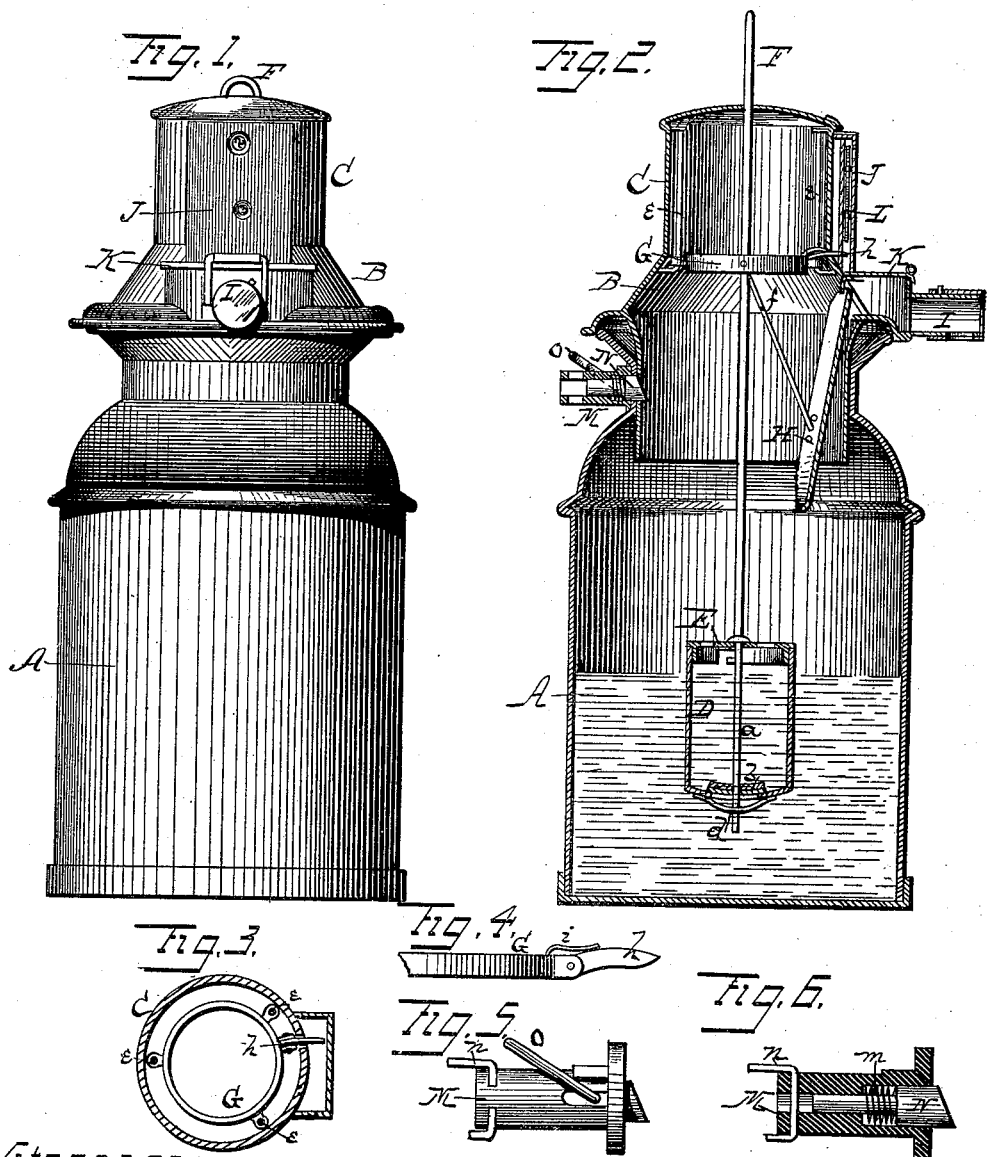

UNITED STATES PATENT OFFICE.

GEROW KOONS, OF ST. LOUIS, MISSOURI.

AUTOMATIC-MEASURING MILK-CAN.

SPECIFICATION forming part of Letters Patent No. 230,136, dated July 20, 1880.

Application filed April 22, 1880. (No model.)

*To all whom it may concern:*

Be it known that I, GEROW KOONS, of St. Louis, in the State of Missouri, have invented certain new and useful Improvements in Milk-Cans; and I do hereby declare that the following is a full, clear, and exact description thereof, reference being had to the accompanying drawings, and to the letters of reference marked thereon, which form part of this specification.

My invention relates to milk-cans; and it consists in the construction and arrangement of a measuring-dipper and self emptying and registering devices connected to the lid of the can, whereby a perfect account is kept of all milk taken out, and no milk can be taken out unless the register shows it, and no water can be put into the can, all as hereinafter more fully set forth.

In order to enable others skilled in the art to which my invention appertains to make and use the same, I will now proceed to describe its construction and operation, referring to the annexed drawings, in which—

Figure 1 is a side elevation, Fig. 2 a central vertical section, and Figs. 3, 4, 5, and 6 are details, of my invention.

A represents the milk-can, of any ordinary construction, provided with the lid B, upon which is a central upwardly-projecting cylinder, C, closed at the top.

D represents a cylindrical dipper, provided with a cover, E, fastened thereto by an ordinary bayonet-lock or in any other suitable manner. The cover E is perforated, as shown, and in the bottom of the dipper is a central opening, which is closed by an interior valve, b, attached to a rod or stem, a, that passes through the center of the cover and through a cross-bar or plate, d, attached to bottom of dipper, for guiding the valve properly up and down. The dipper is provided with a bail or handle, F, which passes up through a slot in the top of the cylinder C on the lid. This bail passes through the center of a ring, G, which slides up and down upon rods e, attached to the inside of the can-lid, and this ring is, by rods f f, connected with a hinged spout, H. When the dipper is down in the milk the milk enters the same both at top and bottom and fills it. As soon as the dipper commences to be lifted the valve b closes and the dipper remains full. By continuing to lift the dipper the ring G is also raised, which causes the inside spout, H, to turn upward on its hinge, and this spout will then press against the lower end of the valve-rod a and open the valve, thus allowing the milk to pass out at the bottom into the spout H, and from this, through an outside spout, I, in the can-lid, into any vessel. The downward movement of the dipper pushes the inside spout, H, back out of the way against the inside of the lid and lowers the ring G.

Over the outside spout, I, is a box, J, preferably hinged to the top of the cylinder, and locked at the lower end. This box or casing contains a registering apparatus, L, which is operated by means of an arm, h, pivoted in ears upon the ring G and projecting through a vertical slot in the cylinder. A spring, i, holds this arm in proper position for operating the register when the ring is raised by the dipper, while the arm will turn upward and ride over the teeth in the register when the ring is lowered. The register may be constructed in any suitable manner, and the different wheels of the register prevented from turning backward by a ratchet or other convenient means.

The outside spout, I, on the can-lid is provided with a hinged cover, K, which is fastened by the register-box J, and this register-box is to be locked or fastened from the inside of the cylinder. The outside spout is made in this manner to prevent the dripping and exclude dust, and is more easily cleaned.

The lid B is fastened to the can by the following means: On the neck of the can is fastened a short cylindrical case, M, in which is a bolt, N, with springs m arranged to throw the bolt inward and into a hole in the rim or flange of the lid. Behind the bolt in the case M is an opening to admit of a tag or wire, n. There are one or more holes made in the rim of the lid, and when the lid is pressed down the bolt springs into one of them and holds it secure. The tag n, made of lead or other suitable material, is then passed through behind the bolt by bringing the ends thereof together and fastening the same, or otherwise pinching the ends, so that it cannot be removed without destroying the tag, and said tag may also have letters, figures, or other characters impressed thereon to prevent counterfeiting.

The bolt N is provided with a wire bail, O, for pulling it back to remove the lid. By placing this bail over the outer end of the case M the bolt is held drawn back.

Having thus fully described my invention, what I claim as new, and desire to secure by Letters Patent, is—

1. A dipper for milk-cans provided with a perforated cover and having an interior valve attached to a vertically-movable rod for opening and closing an opening in the bottom of the dipper, substantially as herein set forth.

2. In a milk-can, a hinged spout operated by the movement of the dipper, and when raised opening a valve in the dipper to discharge the contents thereof, substantially as herein set forth.

3. In a milk-can, a registering apparatus operated by the movement of the dipper, in combination with an automatic emptying device, substantially as herein set forth.

4. The combination, in a milk-can, of a dipper provided with a suitable valve, a hinged spout, and a registering apparatus, substantially as herein set forth.

5. The combination of the hinged spout H, connecting-rods $f f$, ring $g$, guide-rods $e$, and the dipper provided with valve $b$ and rod $a$, substantially as and for the purposes herein set forth.

6. The combination of the ring G, operated by the dipper and operating the hinged spout H, the pivoted arm $h$, spring $i$, and a registering apparatus, substantially as and for the purposes herein set forth.

7. The combination of the milk-can lid B, interior hinged spout, H, exterior spout, I, with lid K, and the register-casing J, substantially as and for the purposes herein set forth.

GEROW KOONS.

Witnesses:
E. A. DRURY,
L. W. LOW.